UNITED STATES PATENT OFFICE 2,571,849

ANTIBACTERIAL COMPOSITION

William O. Elson, Chicago, Ill., assignor to The Kendall Company, Boston, Mass., a corporation of Massachusetts No Drawing. Application March 17, 1949,
Serial No. 82,020

4 Claims. (Cl. 167—63)

This invention relates to compositions for inhibiting the growth of bacterial organisms which are the causitive agents of topical infections in animals.

The principal object of this invention is the provision of an antibacterial composition for the treatment and prophylaxis of local wound infections which has a wider range of effectiveness than any heretofore available.

Compositions of this invention possess the advantages of being stable over long periods of time, of being capable of heat sterilization without appreciable loss of antibacterial activity and of possessing characteristics which cause them to adhere to dressing materials without excessive powdering-off. Accordingly, they find use as powdered medicaments, as dried impregnants on dressing materials, or incorporated in various liquid, semiliquid or solid vehicles.

Compositions of this invention comprise a mixture of tyrothricin and one or more nitro furan compounds as hereinafter described.

Tyrothricin is the name that has been adopted for the active principle extracted from the culture of a spore-forming soil bacillus known as *Bacillus brevis*. Tyrothricin consists of a mixture of at least two substances, mainly gramicidin and tyrocidin. While gramicidin is the more effective substance of the two, tyrocidin contributes some activity to the mixture. For practical manufacturing reasons the separation of the two factors is undesirable; from a clinical standpoint, it is unwarranted. At the proper stage of growth of *Bacillus brevis*, the cultures are collected and the active principle precipitated by the addition of acid. The precipitate is extracted with alcohol and purification brought about by re-precipitation and extraction with a mixture of acetone and ether to remove fatty materials therefrom.

Tyrothricin is obtainable at the present time from Wallerstein Co., Inc., 180 Madison Ave., New York city, and from S. B. Penick & Co., Jersey City, New Jersey.

Nitro furan compounds used in the compositions of this invention have the general formula:

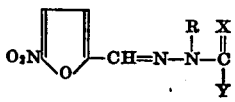

in which R represents hydrogen or an alkyl or hydroxyalkyl radical, X represents a divalent substituent such as O or S, and Y represents an amido, alkyl, amido alkyl, alkylamido, carbamido, guanido, carbamyl, or hydroxyalkyl carbamyl radical.

Examples of nitro-furan compounds corresponding to the general formula and useful singly or plurally, in admixture with tyrothrycin as antibacterial compositions of this invention are 5-nitro-2-furaldehyde 2' methyl semicarbazone; 5-nitro-2-furaldehyde 4'-methyl semicarbazone; 5-nitro-2-furfuryliden amino biuret; 5-nitro-2-furaldehyde 2'-(B-hydroxyethyl) semicarbazone; 5-nitro-2-furfurylidene aminocarbamyl guanidine hydrochloride; 5-nitro-2-furfurylidene glycyl hydrazide hydrochloride; 5-nitro-2-furaldehyde semioxamazone; 5-nitro-2-furaldehyde 5'-(B-hydroxy-ethyl) semioxamazone and 5-nitro-2-furaldehyde thiosemicarbazone. A most powerful antibacterial agent from this group and the one preferred for its stability, low toxicity and general lack of cytotoxic effects is marketed by Eaton Laboratories, Norwich, N. Y. under the tradename Furacin. The chemical name for this chemo-therapeutic agent is 5-nitro-2-furaldehyde semicarbazone:

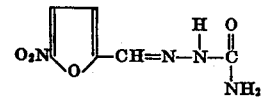

It and other nitro furan compounds may be prepared in accordance with U. S. Patent No. 2,416,234 issued to Stillman and Scott.

Compositions of this invention as aforesaid have the virtue not only of remaining antibacterially active against those organisms against which the constituents thereof are individually active, (and as effectively) but in addition, of being effectively active in weak solution against organisms toward which neither of the constituents of the composition in the absence of the other is alone effectively active in such solution. The compositions thus offer an unexpectedly wide range of activity.

Compositions of this invention may be used in solution or suspension in volatile liquids for the impregnation of various fibrous materials of animal, vegetable and artificial origin. Such fibers may be in loose masses like cotton or wool or may be made into woven or unwoven fabrics. For instance a preferred material for dressings medicated with the compositions of this invention is surgeons gauze. Very large rolls of such gauze may be impregnated in continuous process by running gauze through the medicated solution or suspension, passing the wetted gauze between squeeze rolls to remove the excess liquid and drying it over steam heated rolls. In preparing the medicated impregnating liquid, boiling water may be used as a solvent for the nitro furans particularly nitrofurazone (5-nitro-2- furaldehyde semicarbazone) which is preferred. Tyrothricin is quite soluble in 95% ethyl alcohol. I prefer to dissolve the two constituents separately and then combine them with additional water as desired. The percentages of the constituents on the gauze may be varied by varying the concentration of the liquid, the ratio of the constituents or the pressure of the squeeze rolls.

In addition, the compositions of this invention may also be prepared in non volatile vehicles for use either directly or as the medicament for impregnating dressings. For instance, the constituents may be incorporated into various mixtures containing glycols such as ethylene glycol, methylene glycol and propylene glycol. Various consistencies may be obtained by using polyethylene glycol with such glycols. A salve-like preparation which I prefer has a base consisting of about 10% propylene glycol and 90% polyethylene glycol of about 1500 molecular weight. Nitrofurazone may be stirred into such glycol mixtures directly but as for tyrothricin, I prefer to dissolve it in a minimum of 95% ethyl alcohol before its admixture. I prefer a concentration of about .2% nitrofurazone and about .2% tyrothricin on the total weight for such ointment preparations. Such preparations may be made to approach solidity or may in fact be made solid by using a higher molecular weight material such as polyethylene glycol of 4000 molecular weight. The use of 95% alcohol for dissolving the tyrothricin before it is stirred into the melted solid base material containing the nitrofurazone is recommended.

Where a vehicle is used in conjunction with the compositions of this invention, I prefer that it be water soluble, but it need not be. Water soluble vehicles in general use for medicaments and cosmetics are suitable as are various oil soluble bases used for the same purposes. I have also found the various non-solid silicones of use as vehicles for preparations of this invention.

Among the bacteria whose growth is more effectively inhibited by compositions of this invention are *Streptococcus mitior, Staphylococcus aureus* 4776, *Staphylococcus aureus* 6991, *Staphylococcus aureus* H and *P. vulgaris*. (The numbers are identifying legends of the American Type Culture Collection.)

Demonstration of the effectiveness of compositions of this invention with respect to these organisms are shown by the quantitative inhibition spectra of dressings medicated with each antibacterial agent alone and with mixtures in combination. The method of impregnating and testing was as follows:

Three runs of 44/36 and three of 28/24 mesh surgical gauze were impregnated with the following respective solutions:

(a) Water to make one liter of solution added to 0.75 gram of tyrothricin dissolved at room temperature in 20 cc. of 95% ethyl alcohol.

(b) Water to make one liter of solution added to 0.75 gram of 5-nitro-2 furaldehyde semicarbazone previously dissolved in approximately ½ liter of boiling water. Solution maintained at approximately 45° C.

(c) Water to make 900–950 cc. of solution added to 0.75 gram of 5-nitro-2 furaldehyde semicarbazone previously dissolved in approximately ½ liter of boiling water. To this solution is added 0.75 gram of tyrothricin dissolved at room temperature in 20 cc. of 95% ethyl alcohol and sufficient water to make one liter of total solution. Solution maintained at 45° C.

The gauze impregnated with solutions a, b and c was dried over a steam heated drum. Identical samples 1" x 1¼" of the 28/24 mesh gauze and identical samples of 1" x 1¼" of the 44/36 mesh gauze impregnated with each of the three solutions were prepared. Test tubes were made up containing respectively samples impregnated with solutions a, b and c, each tube containing two samples of 28/24 mesh gauze and one sample of 44/36 mesh gauze impregnated with the same solution. These three pieces of gauze furnish a close approximation to the amount and kind of medicated gauze which the ordinary ready-to-apply combination finger bandage contains.

The average amounts of active ingredients present as an impregnant on respective sets of three gauze pieces was as follows:

(a) 16 gamma of tyrothricin
(b) 19 gamma of furacin
(c) 16 gamma of tyrothricin, and
19 gamma of furacin The test tubes thus prepared were autoclaved at 250° F. for 30 minutes and separated into groups of four for each of the three impregnating solutions. To respective tubes of each group of four similarly inoculated broth was added in 2.5 cc., 5 cc., 10 cc., and 20 cc. amounts. Thus, for each organism used for inoculating broth listed in the table and against which antibacterial activity was tested, twelve tubes comprising gauze impregnated with each of three antibacterial impregnations in four different volumes of broth were used. Broth was inoculated with Streptococcus organisms using 0.5 cc. of a 20-hours broth culture in 125 cc. of sterile tryptose broth. Broth was inoculated with the other organisms tested by diluting 20-hour broth culture 1/1000 with sterile water and adding 0.5 cc. of the dilution to 125 cc. of sterile tryptose broth. After inoculation, the tubes were incubated for 24 hours at 37° C. The table indicates the tested volume up to and including that at which complete inhibition occurred. The latter "G" indicates growth at lowest volume studied (2.5 cc.)

Table

| | Complete Inhibition up to and Including Volume Indicated | | |
|---|---|---|---|
| | Tyrothricin | 5-nitro-2 furaldehyde semicarbazone | Tyrothricin plus 5-nitro-2 furaldehyde semicarbazone |
| | Cc. | Cc. | Cc. |
| Strep. pyogenes 8668 | 20 | 20 | 20 |
| Strep. pyogenes 6636 | 20 | 5 | 20 |
| Strep. pyogenes 4543 | 20 | 20 | 20 |
| Strep. mitior | 5 | 2.5 | 10 |
| Strep. hemolyticus | 10 | G | 10 |
| Strep. lactis 6057 | 20 | 2.5 | 20 |
| Strep. dysgalactiae | 20 | 10 | 20 |
| Strep. faecalis 6057 | 20 | 5 | 20 |
| Strep. faecalis 1305 | 10 | G | 10 |
| Enterococcus 1719 | 20 | 5 | 20 |
| Staph. Aureus 152 | 10 | 10 | 20 |
| Staph. aureus 4776 | 5 | 10 | 20 |
| Staph. aureus 6343 | G | 10 | 10 |
| Staph. aureus FDA | G | 10 | 10 |
| Staph. aureus 6991 | 5 | 10 | 20 |
| Staph. aureus H | 5 | 10 | 20 |
| Staph. albus N | 20 | 20 | 20 |
| Staph. albus 151 | 5 | 10 | 10 |
| Staph. albus 4841 | 20 | 20 | 20 |
| C. diphtheriae | 20 | 20 | 20 |
| E. coli | G | 2.5 | 2.5 |
| Aer. aerogenes | G | G | G |
| P. vulgaris | G | G | 2.5 |
| Ps. aeruginosa | G | G | G |
| Ps. fluorescens | G | G | G |

In the table the tubes represented by the volumes under the headings Tyrothricin and Tyrothricin plus 5-nitro-2 furaldehyde semicarbazone each contain the same amount of tyrothricin. Similarly the tubes represented by the volumes under the headings 5-nitro-2 furaldehyde semicarbazone and Tyrothricin plus 5-nitro-2 furaldehyde semicarbazone each contain the same amount of 5-nitro-2 furaldehyde semicarbazone. That is the larger volumes indicated are more dilute solutions of the drugs and complete inhibition at such volumes indicates increased sensitivity. The letter G indicates that at the highest concentration of the drugs (lowest volume 2.5 cc.) the organism continued to grow. Three facts are demonstrated by the table. First the table indicates the general specificity or limited action of tyrothricin and 5-nitro-2-furaldehyde semicarbazone when used alone. Secondly, the table demonstrates the excellent coverage and wide range of activity of the combination of the two drugs. Thirdly, the table demonstrates a surprising and unpredictable synergistic action in that these drugs, differing greatly in their chemical structure and the way they affect bacteria, provide effective inhibition in combination at dilutions where they do not individually provide effective inhibition.

I claim:

1. An antibacterial composition, having a synergistic effect, comprising tyrothricin and 5-nitro-2-furaldehyde semicarbazone.

2. Fabric impregnated with the dried residue from a composition comprising tyrothricin and 5-nitro-2-furaldehyde semicarbazone in a volatile vehicle, said residue being antibacterial and having a synergistic effect.

3. A combination bandage comprising a pressure sensitive adhesive strip and a medicated dressing adhered thereto, the medication on said dressing consisting of a composition, having a synergistic effect, comprising tyrothricin and 5-nitro-2-furaldehyde semicarbazone.

4. An ointment comprising a salve-like vehicle carrying as active ingredients, tyrothricin and 5-nitro-2-furaldehyde semicarbazone, said ingredients being antibacterial and having a synergistic effect.

WILLIAM O. ELSON.

REFERENCES CITED

The following references are of record in the file of this patent:

UNITED STATES PATENTS

| Number | Name | Date |
| --- | --- | --- |
| 2,416,234 | Stillman et al. | Feb. 18, 1947 |

OTHER REFERENCES

Clinical Medicine, Sept. 1946, p. 32.
American Druggist, Nov. 1945, p. 45.
J. A. P. A., Scientific Edition, May 1946, pp. 141–147.